Sept. 8, 1925.
W. W. SHAW
1,553,115
APPARATUS FOR FILLING STICK HOLDERS
Filed Feb. 21, 1924 — 2 Sheets-Sheet 1
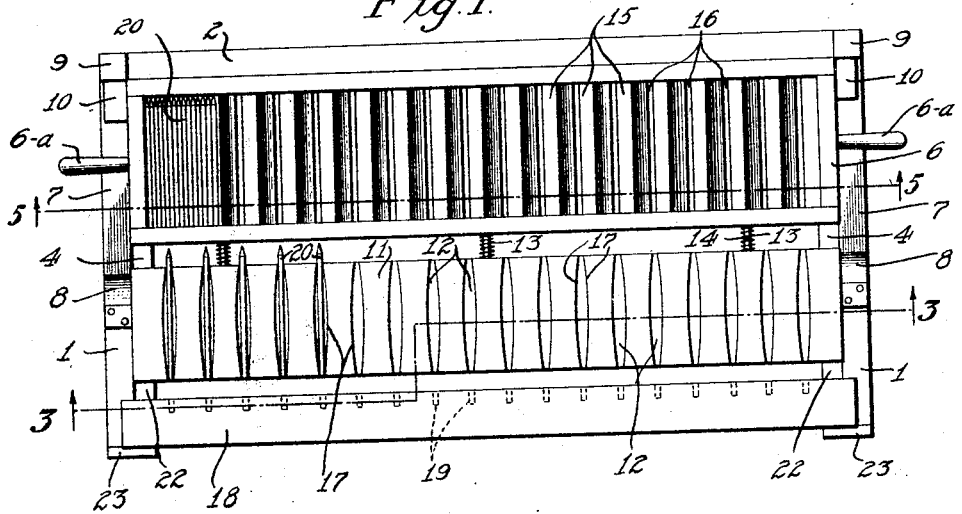
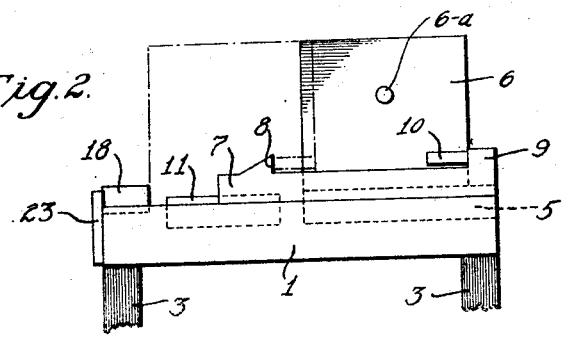
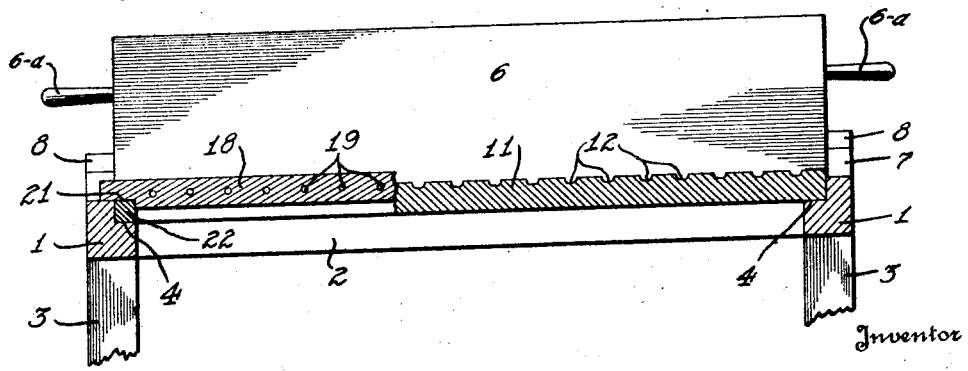
Inventor
Walter W. Shaw
By
Attorney

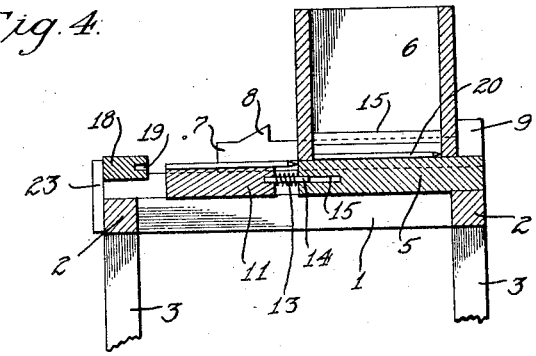
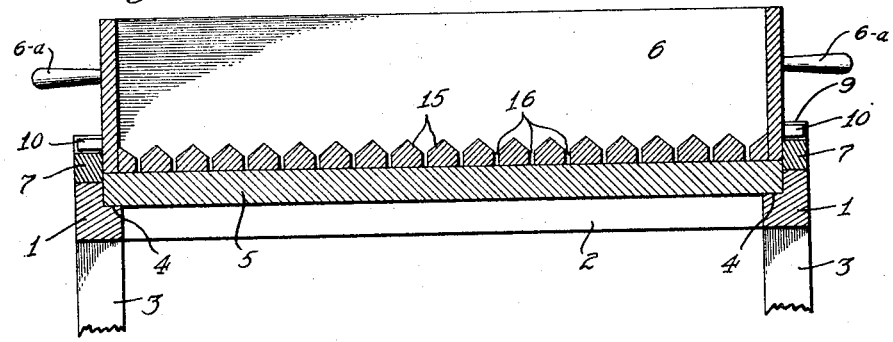
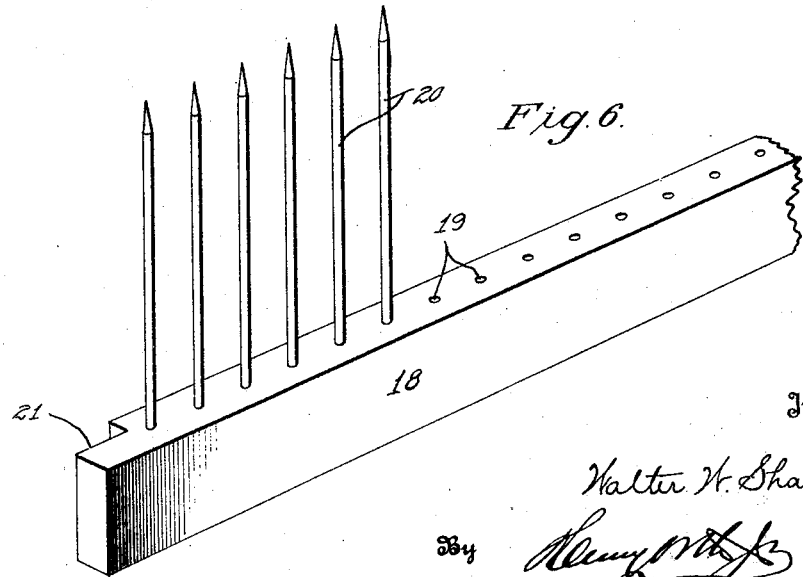

Patented Sept. 8, 1925.

1,553,115

UNITED STATES PATENT OFFICE.

WALTER WARING SHAW, OF WINNIPEG, MANITOBA, CANADA.

APPARATUS FOR FILLING STICK HOLDERS.

Application filed February 21, 1924. Serial No. 694,314.

*To all whom it may concern:*

Be it known that I, WALTER WARING SHAW, a citizen of the United States of America, residing at Winnipeg, Province of Manitoba, Canada, have invented certain new and useful Improvements in Apparatus for Filling Stick Holders; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to apparatus for filling stick holders with short sticks or skewers, the holders, which are in the form of bars, being designed for use in connection with machines for manufacturing the class of candy known as suckers. The sticks constitute handles for the candy while it is being consumed and are inserted in the candy during the molding and cutting operation.

Stick holders used in machines of this character are, so far as known, connected to and form part of the machine. At the end of each molding and cutting operation the stick holder releases the sticks leaving them in the candy which is removed from the molds by hand and another molding and cutting operation must be delayed until the holder is again filled by individually placing other sticks in the holder and clamping them therein.

The object of my invention is to provide a simple and cheap form of stick holder that is quickly filled and readily placed on the candy forming machine and removed therefrom together with the sticks and after the candy has been molded and cut these holders constitute racks for the product during the hardening process. A further object of the invention is to provide means for rapidly filling the holders so that a filled holder is always on hand and the operation of the candy machine may be practically continuous.

The apparatus comprises a hopper of substantially the same length as that of the stick holder and of a width substantially that of the length of the sticks. The bottom of the hopper is formed with a plurality of transverse openings of a size to permit the passage, one at a time, of a single stick therethrough. Said openings register with transverse grooves formed in an auxiliary base or receiver mounted in front of and spaced from the hopper and when the latter is moved over the receiver a stick will drop through each opening in said bottom and be received in a corresponding groove in the receiver. As the sticks are longer than the grooves, their rear ends, which are preferably pointed, project over the rear edge of the receiver and in falling into the grooves said sticks pass below the base of the hopper on which the latter normally rest. A bar having a series of holes, formed in one edge thereof, adapted to receive the front ends of the sticks is placed in front of the receiver so that said holes register with the grooves of the receiver. By pushing this bar against the front edge of the receiver, the latter with the bar is moved longitudinally of the sticks and as said sticks are held against movement by the base of the hopper, the holes in the bar as the latter is moved towards the hopper receive the front ends of the sticks. The bar filled with the sticks is moved by hand and placed in front of the molds of the candy cutting and molding machine.

I shall describe in full that form of the invention which I have selected for illustration in the drawings accompanying and forming a part of the present specification, but it is to be understood that I do not limit myself to such form, since the invention as expressed in the claims may be embodied in a plurality of forms.

Referring to the accompanying drawings:

Figure 1 is a plan view of an apparatus embodying my invention;

Fig. 2 is a side view;

Fig. 3 is a vertical section on the line 3—3 of Fig. 1;

Fig. 4 is a transverse vertical section;

Fig. 5 is a vertical section on the line 5—5 of Fig. 1, and

Fig. 6 is an enlarged perspective view of a portion of the stick holder bar.

The supporting frame of the apparatus preferably consists of two side rails 1, connected by end members 2, and mounted on legs 3.

The inner faces of the side rails are rabbeted to form supporting flanges 4, on which at the rear of the frame is mounted a fixed support or base 5, Figs. 4 and 5, for the hopper 6.

On top of the rails 1 are mounted longitudinal guide members 7 forming lateral guides for the hopper and having front and rear stops 8 and 9 respectively adapted to be engaged by stops 10 on the hopper to limit the movements of the latter.

Slidably mounted on the flanges 4 in front of the fixed base 5 is a receiving member or auxiliary base 11. This member 11 is formed with a plurality of transverse grooves 12 and, as shown in Figure 4, the top face of the receiving member lies in the same horizontal plane as the top face of the base 5, so that the hopper may be easily moved by the handles 6ᵃ from the base onto the receiving member.

The receiving member 11 is normally held spaced from the base 5 by means of three or more coiled springs 13, interposed between the opposing edges of the base and receiving member. These springs are mounted on pins 14 fixed in the edge of the receiving member and holes 15 are formed in the edge of the base to receive the pins when the receiver 11 is moved towards the base.

The bottom of the hopper is preferably formed of a plurality of transversely arranged parallel slats or bars 15, spaced apart to form discharge slots 16, the top of each bar being wedge-shape to facilitate the feeding of the sticks to the slots. These slots correspond in number and arrangement with the grooves 12 formed in the receiver 11 and are of a size to permit the passage of only one stick at a time. The bottoms of these slots are kept closed by the top of the base 5 while the hopper rests thereon. When the hopper is moved along the side rails 1 between the guides 7 from the base onto the receiver the slots in the bottom of the hopper will register with the grooves in the receiver and a stick will drop into each groove. The hopper is then returned to the base. As the width of the receiver is less than the length of the sticks, the latter will project over the inner or rear edge of the receiver and lie in a plane below the top of the base 5 as shown in Fig. 4.

Owing to the fact that some of the sticks are not perfectly straight, the sides 17 of the groove may be curved as shown in Fig. 1, in order to permit a curved stick to rest in the groove below the top of the receiver. This will prevent locking and insure a smooth back and forth movement of the hopper.

The stick-holder consists of a bar 18 having formed in one side a series of holes 19 for the reception of the sticks 20. These holes correspond in number and arrangement with the grooves 12 of the receiver and are of a size to receive and firmly hold the sticks therein. To fill these bars, they are placed, one at a time on the side rails 1, in front of the receiver 11, the holes of bars facing the grooves. To bring the holes of the bar into register with the grooves of the receiver, the bars are formed with end recesses 21, which fit over bearing pieces 22, of hard wood, mounted on the flanges 4, as shown in Fig. 3; stop pieces 23 being fixed to the front of the frame to prevent the bars from dropping off of the latter.

Instead of the recesses 21 and blocks 22, guide blocks, adapted to slide on the flanges 4, may be fixed to both sides of the bars, so that either side may be laid on the rails 1.

The operation of the apparatus is as follows: The hopper 6 is filled with sticks 20 so that the latter lie substantially parallel to the bars forming the bottom of the hopper; the wedge shaped tops of the bars will cause the sticks at the bottom of the pile to be automatically fed to the discharge slots 16. These slots are of a width to permit the entrance of one stick at a time into the slots and are normally closed by the fixed base 5 on which the hopper 6 is movably mounted. If the latter is moved from the position shown in Fig. 1 to the position indicated in dotted lines Fig. 2 over the auxiliary base 11, the bottom stick in each slot 16 will drop into a groove 12 in the auxiliary base. As the width of the base is less than the length of the sticks and is normally held spaced from the fixed base 5, the sticks deposited in the slots 12 will lie below the top of the base 5 with their inner ends engaging the side of said base, as shown in Fig. 4. The sticks after dropping into the slots 12 will support the sticks remaining in the slots 16 above the face of the base 5 until the hopper is again pushed back over the latter, and during the backward movement of the hopper the bottom stick in each slot 16 will drop by gravity onto the base 5. An empty stickholding bar 18, with the holes 19 facing the auxiliary base 11, is moved along the side rails 1 into contact with the outer edge of said auxiliary base, the recesses 21 in the bar 18 operating to accurately position the latter so that the holes 19 will register with the sticks. Both the bar 18 and auxiliary base 11 are now moved towards the fixed base 5 compressing the springs 13, and as the sticks 20 are held stationary by the edge of the base 5 the rear ends of the sticks enter the holes 19 in the bar 18. When the filled bar is removed from the rails 1 the base 11 is automatically returned to its normal position by the springs 13 in position for receiving a fresh supply of sticks when the hopper 6 is again moved over the auxiliary base.

I claim:—

1. An apparatus of the character described comprising a stick storage-receptacle, and means controlled by the movement of the latter to simultaneously discharge a plurality of sticks therefrom in spaced relation to each other.

2. An apparatus of the character described, comprising a stick storage hopper having a plurality of spaced parallel discharge openings in the bottom thereof, and means controlled by the movement of the hopper to simultaneously discharge a single stick from each opening.

3. An apparatus of the character described, comprising a stick storage hopper having a plurality of spaced parallel discharge openings in the bottom thereof, means controlled by the movement of the hopper to simultaneously discharge a single stick from each opening, and means to maintain the discharged sticks in spaced relation to each other.

4. An apparatus of the character described, comprising a stick storage hopper having a plurality of spaced parallel discharge openings in the bottom thereof, means controlled by the movement of the hopper to simultaneously discharge a single stick from each opening, means to maintain the discharged sticks in spaced relation to each other, a stick holder, and means whereby said spaced sticks are mounted in the holder simultaneously.

5. An apparatus of the character described, comprising a hopper, a base normally closing the bottom of the hopper, an auxiliary base having stick receiving grooves therein, and means whereby the hopper may be moved from one base to the other.

6. An apparatus of the character described, comprising a hopper having a plurality of openings spaced apart in parallel relation for the discharge of the sticks singly therefrom, means to normally close said openings, and a receiving member having a plurality of grooves adapted to be brought into register with said openings to effect an automatic discharge of the sticks from each opening simultaneously.

7. An apparatus of the character described, comprising a storage hopper having a plurality of transverse discharge openings spaced apart in parallel relation in the bottom thereof, each opening adapted to discharge sticks singly therefrom, means to close said openings, a receiver mounted adjacent the hopper having a plurality of transverse grooves formed therein adapted to receive the sticks, and means whereby said openings are brought into register with the grooves to effect an automatic discharge of the sticks from each opening simultaneously.

8. An apparatus of the character described, comprising a hopper having a plurality of transverse discharge openings in the bottom thereof, a base normally closing the openings, an auxiliary base having stick receiving grooves therein, and means whereby the hopper may be moved from one base to the other.

9. An apparatus of the character described, comprising a hopper having a plurality of transverse discharge openings in the bottom thereof, oppositely inclined stick supports leading to the openings, a base normally closing the openings, an auxiliary base having stick receiving grooves therein, and means whereby the hopper may be moved from one base to the other.

10. An apparatus of the character described, comprising a hopper having a plurality of discharge openings in its bottom each adapted to permit the passage of a single stick therethrough, a base member for normally closing the openings, laterally arranged guides for the hopper, an auxiliary base member, slidable between the guides adapted to receive the hopper and having a plurality of grooves arranged to register with said openings, and a bar having holes therein, adapted to register with the grooves in the auxiliary base.

11. An apparatus of the character described, comprising a hopper having a plurality of discharge openings in its bottom each adapted to permit the passage of a single stick therethrough, a base member for normally closing the openings, laterally arranged guides for the hopper, an auxiliary base member slidable between the guides adapted to receive the hopper and having a plurality of grooves arranged to register with said openings, springs interposed between the two base members, and a bar having holes therein adapted to register with the grooves in the auxiliary base.

12. An apparatus of the character described, comprising a fixed base member, an auxiliary base member movably mounted in front of the latter and having a plurality of transverse grooves formed in the top face thereof, a hopper having a plurality of discharge openings in its bottom in operative relation to said grooves, and means whereby the hopper may be moved over said base members for opening and closing the discharge openings.

13. An apparatus of the character described, comprising a fixed base member, an auxiliary base member movably mounted in front of the latter and having a plurality of transverse grooves formed in the top face thereof, springs interposed between the opposing edges of the base members, a hopper having a plurality of discharge openings in its bottom in operative relation to said grooves, and means whereby the hopper may be moved over said base members for opening and closing the discharge openings.

14. An apparatus of the character described, comprising a fixed base member, an auxiliary base member movably mounted in front of the latter and having a plurality of transverse grooves formed in the top face thereof, springs interposed between the opposing edges of the base members, side rails supporting the base members, a hopper slidable on said member having a plurality of discharge openings in its bottom adapted to be closed by fixed base member and arranged to register with the grooves in the auxiliary base member, and a bar slidable on the side rails having holes adapted to register with the grooves of the auxiliary base member.

In testimony that I claim the foregoing as my invention, I have signed my name.

WALTER WARING SHAW.